United States Patent [19]

Katano et al.

[11] Patent Number: 4,560,198
[45] Date of Patent: Dec. 24, 1985

[54] CAR BODY OF A MOTORCAR

[75] Inventors: Hiroki Katano; Hisato Nishida, both of Tokyo; Katsumi Semba, Asaka; Kouji Enomoto, Kawasaki; Kazu Uchida, Tokorozawa, all of Japan

[73] Assignee: Honda Giken Kogyo Kabushiki Kaisha, Tokyo, Japan

[21] Appl. No.: 542,623

[22] Filed: Oct. 17, 1983

[30] Foreign Application Priority Data

Apr. 13, 1983 [JP] Japan ................................. 58-64873

[51] Int. Cl.$^4$ ........................ B62D 21/00; B62D 25/08
[52] U.S. Cl. .................................. 296/185; 296/194; 296/198
[58] Field of Search ....................... 296/185, 187–189, 296/194, 198, 29, 191, 192, 193, 195, 35.2

[56] References Cited

U.S. PATENT DOCUMENTS

| 3,743,347 | 7/1973 | Shaw | 296/35.2 X |
| 3,848,886 | 11/1974 | Reustel et al. | 296/35.2 X |
| 4,428,599 | 1/1984 | Jahnle | 296/185 X |

FOREIGN PATENT DOCUMENTS

| 2408548 | 8/1975 | Fed. Rep. of Germany | 296/35.2 |
| 2628104 | 1/1977 | Fed. Rep. of Germany | 296/187 |

*Primary Examiner*—Robert B. Reeves
*Assistant Examiner*—Russell D. Stormer
*Attorney, Agent, or Firm*—Armstrong, Nikaido, Marmelstein & Kubovcik

[57] ABSTRACT

An improved body for a motorcar having an engine compartment joined to a passenger compartment including a pair of side frames at the opposite longitudinal sides of the engine compartment, each of the side frames including a lower longitudinal strut member and an upper skeleton frame, the lower longitudinal strut members and the upper skeleton frames being connected to vertically extending pillars between the passenger compartment and the engine compartment, the upper skeleton frames extending outwardly and upwardly away from the pillars and are fixedly connected at the inward end of the pillars in an area no higher than the vertical middle part of the pillars.

14 Claims, 9 Drawing Figures

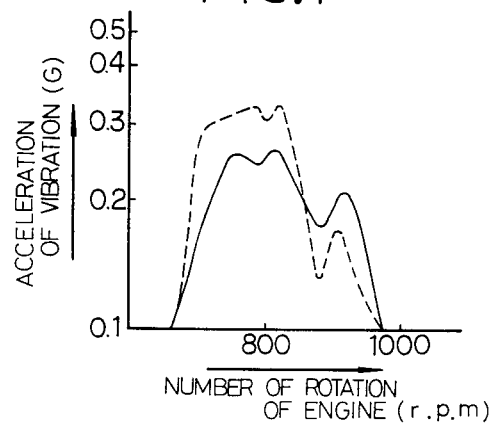
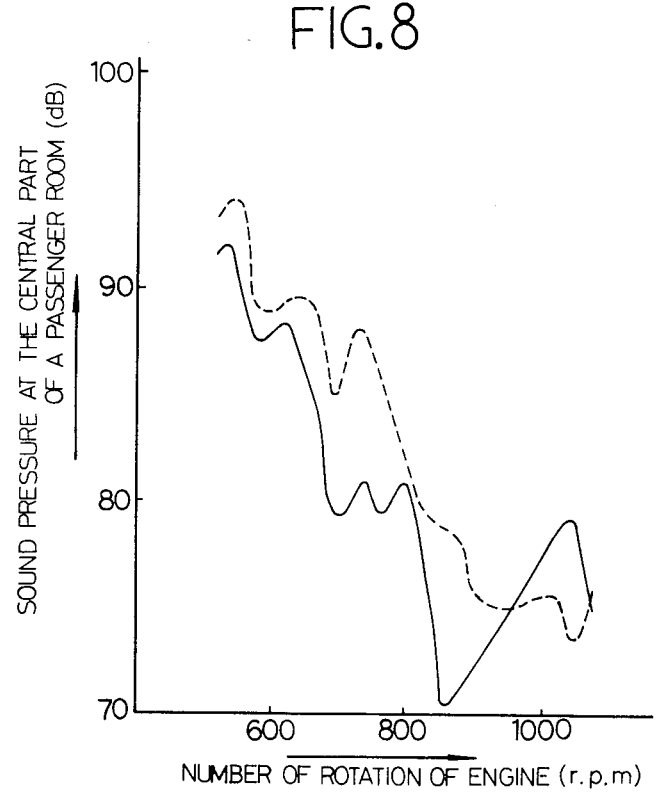

CAR BODY OF A MOTORCAR

BACKGROUND OF THE INVENTION

1. Field of the Invention

The present invention relates to a car body of a motorcar and more particularly to an improved car body of a motorcar including a front body section or a rear body section constituting an engine compartment of which skeleton structure is improved so as to reduce vibration of the car body during low speed operation of an engine including idling operation as well as noise (unpleasant buzzing sound) in a passenger compartment generated due to that vibration.

2. Description of the Prior Art

In a motorcar including a car body comprising a front body section, a central body section constituting a passenger room and a rear body section, either of which front and rear body sections are adapted to constitute an engine compartment, vibration generated by rotation of an engine, particularly low frequency vibration during low speed operation of the engine including idling operation causes the front body section or the rear body section to vibrate and such vibration is transmitted further to the central body section whereby vibratory sound (unpleasant buzzing sound) tends to be generated and recognizable in the passenger compartment. Particularly, in a so-called F. F type motorcar (front engine-front drive type motorcar) having its front body section provided with an engine compartment in which an engine is mounted in the transverse direction, that is, in a direction in which its crankshaft extends at right angles to the travelling direction of a motorcar, and also having front wheels driven by the engine, the engine crankshaft extends at right angles to the travelling direction of the motorcar and thereby the direction of changing of engine torque becomes coincident with the direction of bending mode of the car body due to the mentioned specific arrangement of the engine crankshaft in the transverse direction. As a result, bending vibration of the front body section in the vertical direction is transmitted to the central body section whereby vibration and noise (unpleasant buzzing sound) is amplified in the passenger compartment.

Now, description will be made as to a skeleton structure of the front body section of a conventional F.F type motorcar hereunder with reference to FIG. 1.

At each of both the sides of the engine compartment 2 is arranged a side frame 12 serving as a lower longitudinal strut member and an upper skeleton frame 6 serving as an upper longitudinal strut member for a front wheel housing 8. These frames 6, 12 are fixedly connected to a front pillar 4 at its upper end part and at its lower end part, respectively. As is apparent from FIG. 2 which illustratively simulates deformation vibration of a car body including a front body section as constructed with a skeleton structure in the above-described manner, vibration of the engine propagates over the whole car body while a junction point P at which the side frame 12 is connected to the lower end part of the front pillar 4 acts as a center of vibration. It should be noted that the upper skeleton frame 6 extends linearly and has high rigidity, but at upper junction point Q at which the central body section $B_c$ is joined to the front body section $B_f$, the frame has low rigidity. Thus, the upper junction point Q is caused to deform greatly. As a result, intensive deformation vibration is generated across the passenger compartment 1 and thereby vibration and noise (unpleasant buzzing sound) in the passenger compartment are amplified.

SUMMARY OF THE INVENTION

Thus, the present invention has been made with the foregoing problem residing in conventional car bodies in mind.

It is a primary object of the present invention to provide an improved car body for a motorcar which does not suffer from the mentioned problems and is kept from being deformed at the upper junction point where the central body section, is joined to the front body section or the rear body section so that vibration and noise in the passenger compartment is substantially reduced.

Further, it is a secondary object of the present invention to provide an improved car body for a motorcar wherein bending resonance hardly takes place in the transverse direction of the car body owing to the arrangement of both the lefthand and righthand upper skeleton frames on the front body section, or the rear body section constituting an engine compartment in an unsymmetrical manner relative to the longitudinal center line of the car body so that vibration and noise in the passenger compartment can be reduced further. It should be noted here that in a front, or rear, car body section having left and right skeleton frames symmetrical to each other, bending resonance of the body takes place and causes vibration and noise because of the same number of oscillations inherent in such frames.

To accomplish the primary object there is proposed according to the first aspect of the invention an improved car body for a motorcar wherein each of both the lefthand and righthand upper skeleton frames extends rearward at a downward inclination angle in the area located in the proximity of the pillar until it reaches the latter to be fixedly connected thereto at its vertically middle part or at a position located below the middle part.

Further, to accomplish the secondary object there is proposed according to the second aspect of the invention an improved car body for a motorcar wherein one of the upper skeleton frames extends rearward at a downward inclination angle in the area located near the pillar until it reaches the latter to be fixedly connected thereto at its vertically middle part or at a position located below the middle part, while the other upper skeleton frame is arranged unsymmetrically to the one upper skeleton frame relative to the longitudinal center line of the front body section or the rear body section.

In a preferred embodiment of the invention both the upper skeleton frames are reinforced with reinforcement members so as to assure increased rigidity against bending. The reinforcement member may be constructed in the form of ribs or ruggednesses.

Preferably, each of the upper skeleton frames has a width as measured in the vertical direction which increases gradually as it extends rearward.

Above and other objects, features and advantages of the invention will become more clearly apparent from reading of the following description made in conjunction with the accompanying drawings.

BRIEF DESCRIPTION OF THE DRAWINGS

The accompanying drawings will be briefly described below.

FIGS. 3 to 8 illustrate a car body constructed in accordance with the first embodiment of the invention, wherein:

FIG. 3 is a perspective view of the car body, partially broken away;

FIG. 4 is a view of the front body section of the car body as seen in the direction of arrow IV in FIG. 3;

FIG. 5 is a view of the front body section of the car body as seen in the direction of arrow V in FIG. 3;

FIG. 6 is a simulation diagram schematically illustrating vibration of the car body of FIGS. 3–5;

FIG. 7 is a graph comparatively illustrating acceleration of vibration of the conventional car body of FIGS. 1 and 2 and the car body of FIGS. 3–5, the acceleration of vibration being obtained when vibration in the passenger compartment is measured at the foremost end part of a steering wheel at the center thereof; and FIG. 8 is a graph comparatively illustrating sound pressure measured at the central part of the passenger compartment of the conventional car body of FIGS. 1 and 2 and the car body of FIGS. 3–5.

DETAILED DESCRIPTION OF PREFERRED EMBODIMENTS

Now, the present invention will be described in more details hereunder with reference to FIGS. 3 to 9 which illustrate preferred embodiments as applied to a F.F (Front engine-Front drive) type motorcar.

Figure 3:
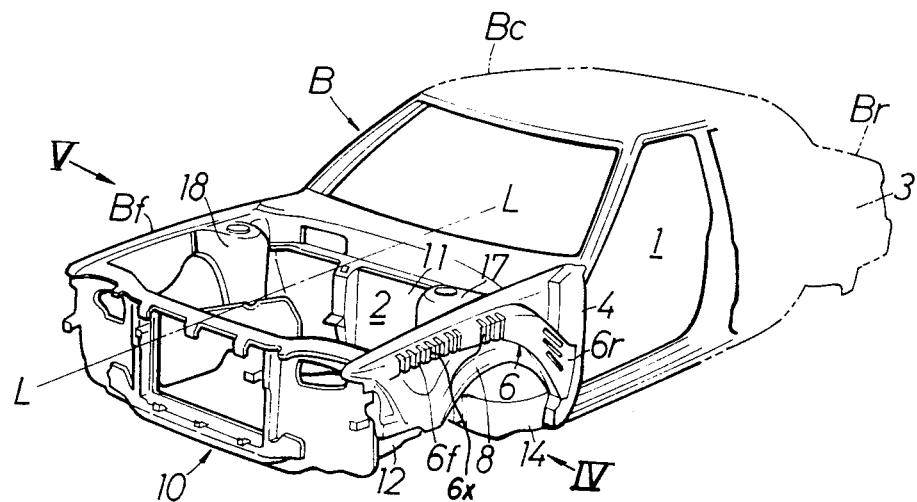

Referring first to FIG. 3, a car body B is constructed by a combination of a central body section $B_c$ constituting a passenger compartment 1, a front body section $B_f$ as an engine compartment 2, and a rear body section $B_r$ as a trunk room 3.

In the illustrated embodiment of the invention, both the central body section $B_c$ and the rear body section $B_r$ are same in skeleton structure as those of conventional motorcars and therefore their description will be omitted. Thus, description will be made hereunder only with respect to the skeleton structure of the front body section $B_f$. It should be noted that the terms "lefthand or righthand" and "front or rear" in the following description are referred to as seen by the driver in the travelling direction of a motorcar.

Figure 4:
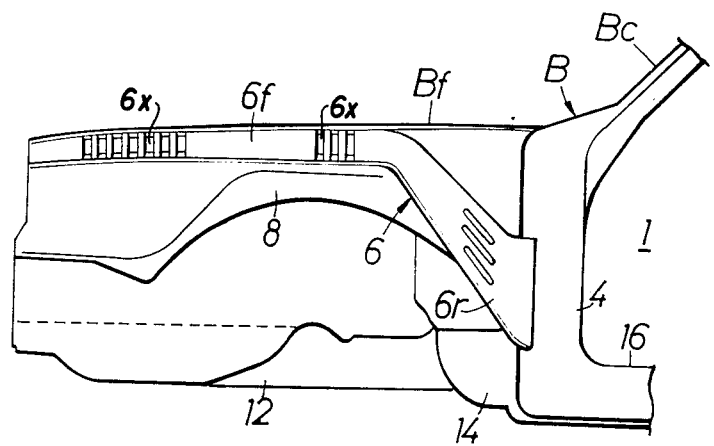
Figure 5:
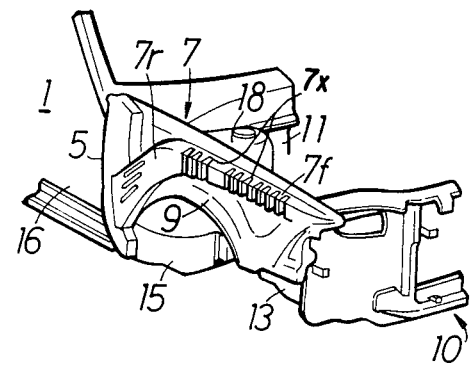

Additionally referring to FIGS. 3 and 4, a lefthand front pillar 4 is vertically arranged in the lefthand boundary area between the central body section $B_c$ and the front body section $B_f$, whereas a righthand front pillar 5, FIG. 5, is vertically arranged in the righthand boundary area therebetween. Further, a lefthand front upper skeleton frame 6, FIGS. 3 and 4, serving as an upper strut member and a lefthand side frame 12 serving as a lower strut member extend from said lefthand front pillar 4 in the forward direction, whereas a righthand front upper skeleton frame 7, FIG. 5, serving as an upper strut member and a righthand side frame 13 serving as a lower strut member extend from said righthand front pillar 5.

The lefthand side frame 12 is connected to the lower part of the lefthand front pillar 4 by way of a front outrigger 14. To assure high rigidity the lefthand upper skeleton frame 6 is designed in a channel-shaped or closed cross-sectional configuration over the whole length and comprises a rear frame $6_r$ extending rearward at a downward inclination angle and a front frame $6_f$ extending forward from said rear frame $6_r$ in the substantially horizontal direction. As will be apparent from the drawing, the width of the rear frame $6_f$ as measured in the vertical direction increases gradually as it extends rearward. The rear end part of the rear frame $6_r$ is fixedly connected to the lefthand front pillar 4 at the vertically middle part thereof or at a position located below the middle part by welding or the like means. It is important that the position where the two members are fixedly connected to one another is properly selected so as not to reduce the strength of the front body section $B_f$. The front frame $6_f$ extends along the lefthand upper edge of the front body section $B_f$ until it reaches the foremost end part of the latter. The position where the front frame $6_f$ is joined to the rear frame $6_r$, i.e., the position where the lefthand front upper skeleton frame 6 is bent is selectively determined in the proximity of a damper house 17.

On the other hand, the righthand side frame 13, FIG. 5, is connected to the lower part of the righthand front pillar 5 by way of a front outrigger 15. Both the lefthand and righthand front upper skeleton frames 6 and 7 are arranged symmetrically relative to the longitudinal center line L—L of the front body section $B_f$. Specifically, the righthand front upper skeleton frame 7 comprises a rear frame $7_r$ and front frame $7_f$ which are joined to one another at a position located in the vicinity of a damper house 18. The rear frame $7_r$ extends rearward at a downward inclination angle until it reaches the middle part of the righthand front pillar 5 or a position located below the latter to be fixedly connected thereto, whereas the front frame $7_r$ extends to the foremost end of the front body section $B_f$ along the righthand upper edge thereof.

To assure increased rigidity against bending both the lefthand and righthand front upper skeleton frames 6 and 7 are reinforced with reinforcement members such as ribs $6x$, $7x$. Further, front wheel houses 8 and 9 adapted to cover the upper part of front wheels are formed integral with the lefthand and righthand front upper skeleton frames 6 and 7 at their lower parts. Both the foremost ends of the lefthand and righthand front upper skeleton frames 6 and 7 are connected to one another by means of a front bulkhead 10 extending therebetween, whereas both the rearmost ends of the same are integrally connected to one another by means of a dashboard 11 which separates the passenger compartment 1 from the engine compartment 2.

As will be readily understood from the above description, the lefthand and righthand front upper skeleton frames 6 and 7 in the front body section $B_f$ include the rear frames $6_r$ and $7_r$ extending rearward in a downward inclination toward the front pillars 4 and 5 and connected to the latter at the middle part thereof or at a position located below the latter.

As an engine mounted in the front body section $B_f$ in the transverse direction is rotated, the direction of variation in engine torque generated by rotation of the crankshaft extending at right angles to the longitudinal direction of the car body B becomes identical with the direction of bending of the car body B whereby pitching of the car body B is amplified. Particularly in an operational area of low speed rotation, including idling operation, the front body section $B_f$ is liable to be affected by low frequency vibration in the direction of pitching.

Figure 1:
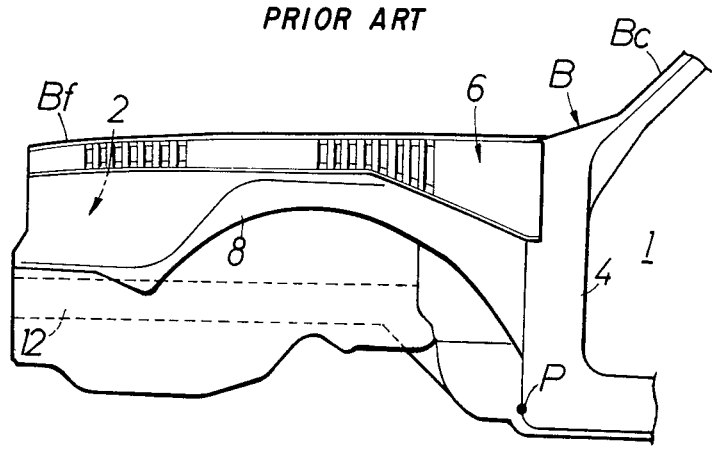
FIG. 1 is a side view schematically illustrating a skeleton structure of a front body section in a conventional car body.
Figure 2:
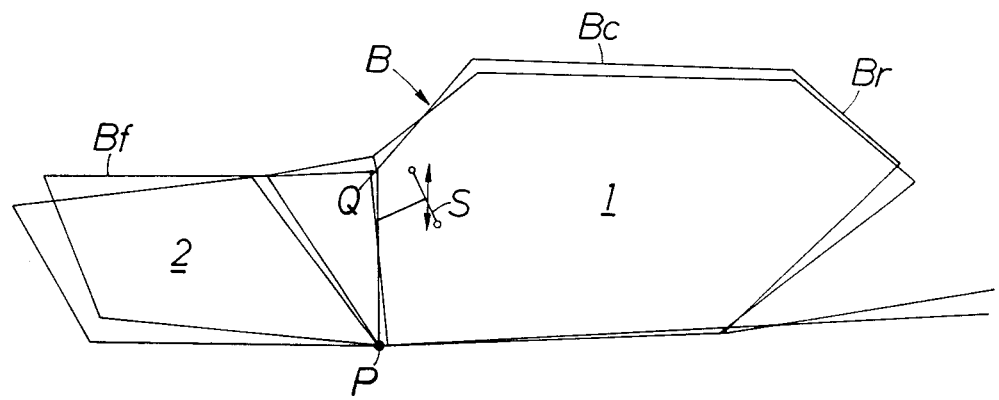
FIG. 2 is a simulation diagram schematically illustrating vibration of the conventional car body.
Figure 6:
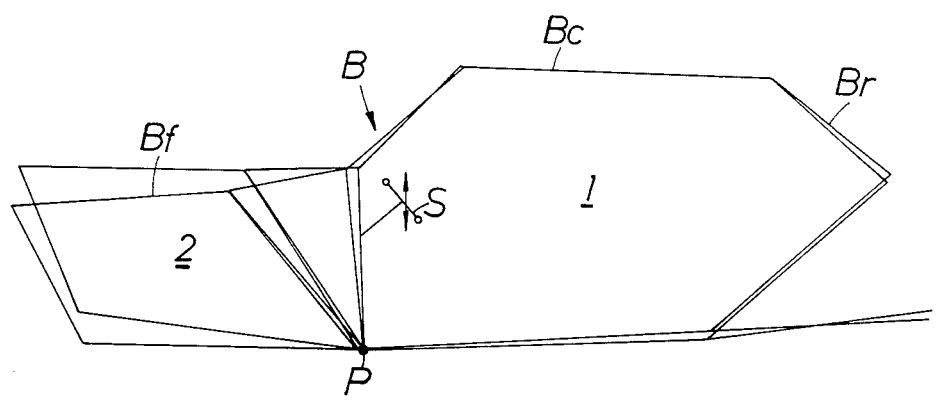

However, according to the invention, as has been described above, both the lefthand and righthand front upper skeleton frames 6 and 7 extend rearward at a downward inclination angle and are connected to the lefthand and righthand pillars 4 and 5 at their middle parts or at a position located below the latter. Thus, as the front body section $B_f$ is subjected to vibration, deformation force transmitted from the lefthand and righthand front upper skeleton frames 6 and 7 to the central body section $B_c$ is exerted onto a bottom floor 16 of the central body section $B_c$. As a result deformation vibration of the passenger room 1 at the central body section $B_c$ is reduced to a considerable extent as illustrated in FIG. 6, compared with that in the conventional body structure shown in FIG. 2.

Now, measurements of acceleration of vibration at the foremost central end of a steering wheel S which have been conducted to examine vibration of the passenger compartment 1 show the results as seen in FIG. 7 in which the frame structure of the invention is identified with a solid line while the conventional frame structure is identified with a dotted line. As will be apparent from this Figure, acceleration of vibration measured at the foremost central end of the steering handle S during low speed rotation of engine, i.e., vibration of the passenger compartment 1 of the car body constructed in accordance with the invention is substantially reduced, compared with that of the conventional car body.

FIG. 8 is a graph which compares sound pressure measured at the center of the passenger compartment in the car body of the invention (as identified with a solid line) with that of the conventional car body (as identified with a dotted line). As is apparent from this graph, the passenger compartment 1 of the invention achieves substantial reduction in level of noise generated by vibration during low speed rotation of engine when compared with the conventional car body.

Figure 9:
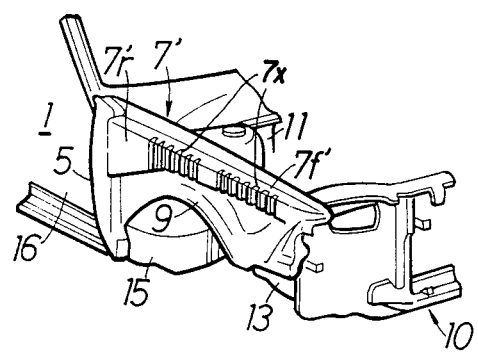
FIG. 9 is a perspective view of the front body section of the car body according to the second embodiment of the invention.

Next, FIG. 9 shows an essential portion of a car body structure in accordance with the second aspect of the invention. In this embodiment one upper skeleton frame, for instance, the lefthand front upper skeleton frame 6 is designed in the same configuration as that shown in FIGS. 3 and 4 and extends rearward to be fixedly connected to the lefthand front pillar 4 at its middle part or at the position located below the latter, whereas the other one, for instance, the righthand front upper skeleton frame 7', FIG. 9, is arranged unsymmetrically to the lefthand front upper skeleton frame 6 relative to the longitudinal center line L—L of the front body section $B_f$. Specifically, the righthand front upper skeleton frame 7' extends rearward in the substantially horizontal direction and comprises a rear frame $7_r'$ and a front frame $7_f'$ extending forward from the frame $7_r'$ substantially horizontally, said rear frame $7_r'$ having a vertical width which increases gradually as it extends rearward. The rear end part of the rear frame $7_r'$ is fixedly connected to the righthand front pillar 5 at its upper part by welding or the like means, whereas the front frame $7_f'$ extends to the foremost end of the front body section $B_f$ along the righthand upper edge thereof.

When the skeleton structure of the front body section $B_f$ is designed unsymmetrically, as in FIG. 9, relative to the longitudinal center line L—L in the above-described manner, it has been found that resonance of bending hardly takes place in the transverse direction of the front body section $B_f$ and thereby vibration and noise in the passenger compartment 1 caused by bending vibration in the vertical direction in the front body section $B_f$ can be remarkably reduced. Further, since the rear part of the lefthand front upper skeleton frame 6 extends rearward in a downward inclination until it is fixedly connected to the lefthand front pillar 4 at its middle part or at the position located below the middle part, bending deformation force is to be transmitted to the bottom floor 16 of the central body section $B_c$ at least at the left side of the front body section $B_f$ whereby vibration and noise recognizable in the passenger compartment 1 is substantially reduced.

It should be noted that the present invention should not be limited only to the above-described type of car body but it may be applied to another type, one in which the front upper skeleton frames 6, 7 and 7' do not include the front frames $6_f$, $7_f$ and $7_f'$. Further, it may be applied either to a car body having engine mounted in the longitudinal direction or to a car body of the type wherein an engine is mounted in the rear body section $B_r$ in the transverse direction or in the longitudinal direction.

As will be readily understood from the above description, a car body according to the first aspect of the invention is constructed such that both the upper skeleton frames extend rearward in a downward inclination in the area located in the proximity of their pillars and are joined to the pillars at the vertically middle parts thereof or at positions located below the latter and thereby deformation of the front body section or the rear body section which constitutes an engine compartment is greatly inhibited from developing to the upper junction where the front body section or the rear body section is joined to the central body section at a relatively low rigidity. As a result, vibration and noise recognizable in the passenger compartment during low speed operation of engine including idling operation can be substantially reduced.

Further, a car body according to the second aspect of the invention is constructed such that one of the upper skeleton frames extends rearward in a downward inclination in the area located in the proximity of the pillar until it is joined to the middle part thereof or at a position located below the middle part and the other upper skeleton frame is arranged unsymmetrically in configuration to said one upper skeleton frame relative to the longitudinal center line of the front body section or the rear body section whereby vibratory deformation is greatly inhibited from exerting at one of both the sides of the car body onto the upper junction where the front body section or the rear body section is joined to the central body section at a relatively reduced rigidity. Besides the resonance of bending hardly takes place due to difference in the number of oscillations inherent in both the sides of the car body. Therefore, vibration and noise in the passenger compartment can be reduced further during low speed operation of engine including idling operation, resulting in improved driving comfort and reduced unpleasant feeling during travelling of a motorcar.

While the present invention has been described above only with respect to two aspects of the invention, it should be of course understood that it should not be limited only to them and many changes or modifications may be made in a suitable manner without any departure from the spirit and scope of the invention.

What is claimed is:

1. In a car body for a motorcar of the type having a section constituting an engine compartment joined to a section constituting a passenger compartment, said engine compartment section including a pair of side frames at the opposite longitudinal sides of said engine compartment, each of said side frames including a lower longitudinal strut member and an upper skeleton frame, said lower longitudinal strut members and said upper skeleton frames being connected to vertically extending pillars between said passenger compartment section and said engine compartment section, the improvement wherein each of the upper skeleton frames extends outwardly and upwardly away from said pillar and is fixedly connected at its inward end to said pillar in an area no higher than the vertical middle part of said pillar.

2. A car body as defined in claim 1, wherein the upper skeleton frames are reinforced with reinforcement members so as to assure increased rigidity against bending.

3. A car body as defined in claim 2, wherein the upper skeleton frames are formed with ribs to form said reinforcement members.

4. A car body as defined in claim 1, wherein each of the upper skeleton frames has a vertical width which increases gradually as it extends rearward.

5. In a car body, as recited in claim 1, in which said section constituting an engine compartment is in front of said section constituting a passenger compartment and said each of said skeleton frames extend forwardly and upwardly away from said pillar.

6. In a car body, as recited in claim 1, in which said each of said skeleton frames is fixedly connected at its inward end to said pillar in the vertical middle part of said pillar.

7. In a car body, as recited in claim 1, in which said each of said skeleton frames is fixedly connected at its inward end to said pillar below the vertical middle part of said pillar.

8. In a car body for a motor car of the type having a section constituting an engine compartment joined to a section constituting a passenger compartment, said engine compartment section including a pair of side frames at the opposite longitudinal sides of said engine compartment, each of said side frames including a lower longitudinal strut member and an upper skeleton frame, said lower longitudinal strut member and said upper skeleton frame being connected to vertically extending pillars disposed in a boundary area defined between said passenger compartment section and said engine compartment section, the improvement wherein one of the upper skeleton frames extends outwardly and upwardly away from said pillar and is fixedly connected at its inward end to the pillar in an area no higher than the vertical middle part of said pillar while the other upper skeleton frame is arranged unsymmetrically in configuration to said one upper skeleton frame relative to the longitudinal center line of the body sections.

9. A car body as defined in claim 8, wherein the upper skeleton frames are reinforced with reinforcement members so as to assure increased rigidity against bending.

10. A car body as defined in claim 9, wherein the upper skeleton frames are formed with ribs to form said reinforcement members.

11. A car body as defined in claim 8, wherein each of the upper skeleton frames has a vertical width which increases gradually as it extends rearward.

12. In a car body, as recited in claim 8, in which said section constituting an engine compartment is in front of said section constituting a passenger compartment and said one of said skeleton frames extends forwardly and upwardly away from said pillar.

13. In a car body, as recited in claim 8, in which said one of the skeleton frames is fixedly connected at its inward end to said pillar in the vertical middle part of said pillar.

14. In a car body, as recited in claim 8, in which said one of the skeleton frames is fixedly connected at its inward and to said pillar below the vertical middle part of said pillar.

* * * * *